(12) United States Patent
Yao (10) Patent No.: US 8,815,988 B2
(45) Date of Patent: Aug. 26, 2014

(54) RESIN COMPOUND, RESIN COMPOSITION, AND RESIN-MOLDED PRODUCT

(75) Inventor: Kenji Yao, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 13/481,195

(22) Filed: May 25, 2012

(65) Prior Publication Data

US 2013/0158173 A1 Jun. 20, 2013

(30) Foreign Application Priority Data

Dec. 20, 2011 (JP) ................................. 2011-278761

(51) Int. Cl.
*C07F 9/09* (2006.01)

(52) U.S. Cl.
USPC ........... 524/127; 528/211; 528/271; 528/212; 528/219; 524/599; 524/606

(58) Field of Classification Search
None
See application file for complete search history.

(56) References Cited

U.S. PATENT DOCUMENTS 3,951,886 A * 4/1976 Miyake et al. ............... 521/48.5
6,022,550 A 2/2000 Watanabe
2010/0305297 A1 * 12/2010 Hoshino et al. ............... 528/296

FOREIGN PATENT DOCUMENTS

JP     A-10-147720     6/1998

* cited by examiner

*Primary Examiner* — Susannah Chung
*Assistant Examiner* — Robert T Butcher
(74) *Attorney, Agent, or Firm* — Oliff PLC (57) ABSTRACT

A resin compound includes a reaction product of (A) aliphatic polyester and/or aliphatic polyamide and (B) an aromatic compound of which a compositional ratio is from 0.1 part by weight to 5 parts by weight with respect to 100 parts by weight of the (A) and which is represented by the following Formula (1), $$(X)-(CH_2OH)_n \qquad \text{Formula (1)}$$

wherein in Formula (1), X represents an n-valent group having one or more aromatic rings, and n represents an integer of from 2 to 10.

5 Claims, 3 Drawing Sheets

RESIN COMPOUND, RESIN COMPOSITION, AND RESIN-MOLDED PRODUCT

CROSS-REFERENCE TO RELATED APPLICATIONS

This application is based on and claims priority under 35 USC 119 from Japanese Patent Application No. 2011-278761 filed Dec. 20, 2011.

BACKGROUND

1. Technical Field

The present invention relates to a resin compound, a resin composition, and a resin-molded product.

2. Related Art

Hitherto, various resin compositions have been provided and used for various purposes. Particularly, the resin compositions are being used for various parts, chassis, and the like of home appliances or vehicles, and for parts of the chassis of office equipment or electronic and electric instruments.

SUMMARY

According to an aspect of the invention, there is provided a resin compound including a reaction product of (A) aliphatic polyester and/or aliphatic polyamide and (B) an aromatic compound of which a compositional ratio is from 0.1 part by weight to 5 parts by weight with respect to 100 parts by weight of the (A) and which is represented by the following Formula (1).

Formula (1)

In Formula (1), X represents an n-valent group having one or more aromatic rings, and n represents an integer of from 2 to 10.

BRIEF DESCRIPTION OF THE DRAWINGS

Exemplary embodiments of the present invention will be described in detail based on the following figures, wherein.

DETAILED DESCRIPTION

Hereinafter, exemplary embodiments as an example of the resin compound, the resin composition, and the resin-molded product of the present invention will be described.

Resin Compound

The resin compound according to the present exemplary embodiment is a resin compound including a reaction product in which aliphatic polyester and/or aliphatic polyamide are/is bonded to an aromatic compound represented by the following Formula (1) (simply referred to as an "aromatic compound" in some cases) in a compositional ratio in which the ratio of the aromatic compound is from 0.1 part by weight to 5 parts by weight with respect to 100 parts by weight of the aliphatic polyester and/or the aliphatic polyamide.

Formula (1)

In Formula (1), X represents an n-valent group having one or more aromatic rings, and n represents an integer of from 2 to 10.

With the resin compound according to the present exemplary embodiment, a resin compound showing excellent flexibility after being molded is realized due to the above constitution.

Though unclear, the reason is considered to be as below.

It is considered that the aromatic compound forms a covalent bond with a carboxyl group at the end of the aliphatic polyester or the aliphatic polyamide molecules via a hydroxymethyl group ($-CH_2OH$) in the Formula (1), and is coordinated with a carbonyl group of the aliphatic polyester or the aliphatic polyamide via another hydroxymethyl group in the Formula (1) as if forming an ionic bond, thereby forming a structure similar to a crosslinked structure (described as a "pseudo-crosslinked structure" in some cases).

It is considered that since the pseudo-crosslinked structure flexibly links the aromatic compound and the aliphatic polyester or the aliphatic polyamide, a resin compound showing excellent flexibility after being molded is realized.

In addition, it is considered that since the aromatic compound has an aromatic ring and a methylene group that is directly or indirectly bonded to the aromatic ring, relatively rigid structures and relatively flexible structures are repeated, so a resin compound showing excellent flexibility after being molded is realized.

It is also considered that in the resin compound according to the present exemplary embodiment, since an aromatic ring of a structural unit derived from the aromatic compound acts with a hydroxymethyl group of the structural unit and with a structural unit derived from the aliphatic polyester or the aliphatic polyamide, a char layer is easily formed on the surface of a molded product when the resin compound-molded product catches fire, and accordingly, the fire is prevented from spreading any further. Consequently, it is considered that according to the resin compound of the present exemplary embodiment, a resin compound showing excellent flame retardancy after being molded is realized.

The aromatic compound and the aliphatic polyester and/or the aliphatic polyamide are considered to form the pseudo-crosslinked structure as described above.

Accordingly, it is considered that the structural unit derived from the aromatic compound is distributed throughout the entire structural unit derived from the aliphatic polyester and/or the aliphatic polyamide. As a result, it is considered that characteristics imparted by the aromatic compound are realized throughout the entire resin compound.

The resin compound according to the present exemplary embodiment is a reaction product in which (A) aliphatic polyester and/or aliphatic polyamide is bonded to the aromatic compound in a compositional ratio in which the ratio of the aromatic compound is from 0.1 part by weight to 5 parts by weight with respect to 100 parts by weight of the (A).

If the ratio of the aromatic compound is 0.1 part by weight or higher with respect to 100 parts by weight of the (A), a resin compound showing excellent flexibility after being molded is realized.

On the other hand, if the ratio of the aromatic compound is 5 parts by weight or lower with respect to 100 parts by weight of the (A), the ratio of the structural unit derived from the (A) in the resin compound does not become too small and is appropriate. In addition to this, due to the original flexibility of the (A), a resin compound showing excellent flexibility after being molded is realized.

In the resin compound according to the present exemplary embodiment, a state where the aliphatic polyester or the aliphatic polyamide has been bonded to the aromatic compound is identified by measuring an infrared absorption spectrum. Specifically, when peaks are observed near 730 cm$^{-1}$ to 740 cm$^{-1}$ and near 3010 cm$^{-1}$ by the infrared absorption spectrum measurement, the bond is identified to be formed.

In the resin compound according to the present exemplary embodiment, the compositional ratio (weight ratio) between the aliphatic polyester or the aliphatic polyamide and the aromatic compound is identified by measuring an infrared absorption spectrum and calculating a ratio between a peak derived from the aliphatic polyester or the aliphatic polyamide and a peak derived from the aromatic compound.

In addition, whether the resin compound according to the present exemplary embodiment is contained in a resin composition or a resin-molded product is detected by, for example, measuring an infrared absorption spectrum or by potentiometric titration.

Aliphatic Polyester

The aliphatic polyester is not particularly limited, and examples thereof include a hydroxycarboxylic acid polymer, a polycondensate of aliphatic diol and aliphatic carboxylic acid, and the like.

Specific examples of the aliphatic polyester include polylactic acid, poly-3-hydroxybutyrate, polyhydroxyhexanoate, polyhydroxyvalerate, and a copolymer of these; polybutylene succinate, polybutylene adipate, polyethylene succinate, polyethylene adipate, and a copolymer of these; and the like.

These aliphatic polyesters may be used alone, or two or more kinds thereof may be used concurrently.

Among these, as the aliphatic polyester, polylactic acid, polyhydroxybutyrate, polybutylene succinate, and a copolymer of two or more kinds of these are desirable, and polylactic acid is more desirable for being combined with the aromatic compound.

The aliphatic polyester may be a single continuous polyester (for example, polyhydroxybutyrate), or an L-isomer and a D-isomer as optical isomers of polylactic acid may be mixed as the aliphatic polyester. Moreover, these may be copolymerized with each other.

Though not particularly limited, the weight average molecular weight of the aliphatic polyester is desirably from 8000 to 150000, and more desirably from 20000 to 100000.

The weight average molecular weight is a value measured by using a gel permeation chromatography instrument (manufactured by Shimadzu Corporation, Prominence GPC model) and using a Shim-pack GPC-80M measurement column. The same method will be applied below.

Aliphatic Polyamide

The aliphatic polyamide is not particularly limited, and examples thereof include polyhydroxyamine, a polycondensate of aliphatic amine and aliphatic diol, and the like.

Specific examples of the aliphatic polyamide include polyamide 4-6, polyamide 6, polyamide 6-6, polyamide 6-10, polyamide 6-12, polyamide 6-13, polyamide 6-14, polyamide 6-15, polyamide 6-16, polyamide 9-10, polyamide 9-12, polyamide 9-13, polyamide 9-14, polyamide 9-15, polyamide 9-36, polyamide 10-6, polyamide 10-10, polyamide 10-12, polyamide 10-13, polyamide 10-14, polyamide 11, polyamide 12, polyamide 12-10, polyamide 12-12, polyamide 12-13, polyamide 12-14, and the like.

These aliphatic polyamides may be used alone, or two or more kinds thereof may be used concurrently.

Among these, as the aliphatic polyamide, polyamide 11 is desirable for being combined with the aromatic compound.

Though not particularly limited, the weight average molecular weight of an aliphatic polyamide resin is desirably from 5000 to 200000, and more desirably from 10000 to 150000.

Aromatic Compound Represented by Formula (1)

The aromatic compound is an aromatic compound represented by the following Formula (1).

Formula (1)

In Formula (1), X represents an n-valent group having one or more aromatic rings, and n represents an integer of from 2 to 10.

The group represented by X in Formula (1) has one or more aromatic rings, and the aromatic ring may be a monocyclic, a polycyclic, or a condensed ring.

Examples of the group represented by X in Formula (1) include groups obtained by removing n hydrogen atoms from substituted or unsubstituted benzene (monocyclic aromatic hydrocarbons); polycyclic aromatic hydrocarbons formed when plural benzenes form a single bond, such as biphenyl and triphenyl; condensed ring aromatic hydrocarbons such as naphthalene, phenalene, phenanthrene, anthracene, triphenylene, pyrene, chrysene, and tetracene; compounds formed when two or more kinds selected from benzene, the polycyclic aromatic hydrocarbons, and the condensed ring aromatic hydrocarbons form a single bond; compounds formed when plural benzenes form a single bond via an alkyl group having from 1 to 12 carbon atoms (for example, a linear or branched alkyl group such as a methyl group, an ethyl group, an n-propyl group, an isopropyl group, an n-butyl group, an isobutyl group, a sec-butyl group, a tert-butyl group, a pentyl group, or a hexyl group); and compounds formed when two or more kinds selected from benzene, the polycyclic aromatic hydrocarbons, and the condensed ring aromatic hydrocarbons form a single bond via an alkyl group having from 1 to 12 carbon atoms (for example, a linear or branched alkyl group such as a methyl group, an ethyl group, an n-propyl group, an isopropyl group, an n-butyl group, an isobutyl group, a sec-butyl group, a tert-butyl group, a pentyl group, or a hexyl group).

Examples of the substituent with which the above groups are substituted include an alkyl group having from 1 to 12 carbon atoms, an alkenyl group having from 2 to 12 carbon atoms, a hydroxy group, a halogen atom (for example, fluorine, chlorine, bromine, or iodine), and the like.

As the substituent, an alkyl group having from 1 to 6 carbon atoms (for example, a linear or branched alkyl group such as a methyl group, an ethyl group, an n-propyl group, an isopropyl group, an n-butyl group, an isobutyl group, a sec-butyl group, a tert-butyl group, a pentyl group, or a hexyl group) or a hydroxy group are desirable, and a methyl group or a hydroxy group are more desirable, in respect that a resin compound showing superior flexibility after being molded is realized.

In Formula (1), n represents an integer of from 2 to 10. That is, the aromatic compound has 2 to 10 hydroxymethyl groups (—CH$_2$OH).

The aromatic compound needs to have two or more hydroxymethyl groups so as to form a covalent bond with a carboxyl group at the end of the aliphatic polyester or the aliphatic polyamide molecules via a hydroxymethyl group and to form a pseudo-crosslinked structure with a carbonyl group of the aliphatic polyester or the aliphatic polyamide via another hydroxymethyl group.

If there are two or more hydroxymethyl groups, the pseudo-crosslinked structure tends to be sufficiently formed, and effects relating to flexibility and flame retardancy tend to be sufficiently obtained. On the other hand, if there are 10 or less hydroxymethyl groups, a crosslinking reaction tends to be inhibited from advancing excessively, and the flexibility tends to be maintained.

n is desirably an integer of from 2 to 8, and more desirably an integer of from 3 to 7, in respect that a resin compound showing superior flexibility after being molded is realized.

As the aromatic compound, an aromatic compound is desirable in which at least one hydroxymethyl group in the Formula (1) is directly bonded to an aromatic ring in the group represented by X. An aromatic compound in which two or more hydroxymethyl groups in the Formula (1) are directly bonded to aromatic rings in the group represented by X is more desirable, and an aromatic compound in which all hydroxymethyl groups in the Formula (1) are directly bonded to aromatic rings in the group represented by X is even more desirable.

It is considered that since the hydroxymethyl group itself is short, and the aromatic ring in the group represented by X and the aliphatic polyester and/or the aliphatic polyamide form a covalent bond via the short hydroxymethyl group and are linked with a pseudo-crosslinked structure, a resin compound that is not easily thermally decomposed and shows excellent thermotolerance after being molded is realized.

The aromatic compound is desirably at least one kind selected from an aromatic compound represented by the following Formula (2), an aromatic compound represented by the following Formula (3), and an aromatic compound represented by the following Formula (4), in respect that a resin compound showing superior flexibility after being molded is realized.

Aromatic Compound Represented by Formula (2)

A desirable exemplary embodiment of the aromatic compound is an aromatic compound represented by the following Formula (2).

Formula (2)

In Formula (2), $R^1$ represents a hydrogen atom or a substituent, and m represents an integer of from 2 to 6. When (6−m) is 2 or greater, R's may be the same as or different from each other.

In Formula (2), when $R^1$ is a substituent, examples of the substituent include an alkyl group having from 1 to 12 carbon atoms, an alkenyl group having from 2 to 12 carbon atoms, a hydroxy group, a halogen atom (for example, fluorine, chlorine, bromine, or iodine), and the like.

As the substituent, an alkyl group having from 1 to 6 carbon atoms (for example, a linear or branched alkyl group such as a methyl group, an ethyl group, an n-propyl group, an isopropyl group, an n-butyl group, an isobutyl group, a sec-butyl group, a tert-butyl group, a pentyl group, or a hexyl group) or a hydroxy group is desirable, and a methyl group or a hydroxy group is more desirable, in respect that a resin compound showing superior flexibility after being molded is realized.

The aromatic compound represented by Formula (2) desirably has at least one alkyl group having from 1 to 6 carbon atoms and at least one hydroxy group, in respect that a resin compound showing superior flexibility after being molded is realized.

In Formula (2), m represents an integer of from 2 to 6. m is desirably an integer of from 2 to 4, and more desirably 2, in respect that a resin compound showing superior flexibility after being molded is realized.

In the aromatic compound represented by Formula (2), two out of at least two hydroxymethyl groups contained in the aromatic compound are desirably positioned in a meta-position or a para-position.

Aromatic Compound Represented by Formula (3)

One desirable exemplary embodiment of the aromatic compound is an aromatic compound represented by the following Formula (3).

Formula (3)

In Formula (3), each of $R^2$, $R^3$, $R^4$, and $R^5$ independently represents a hydrogen atom or a substituent. Each of p and q independently represents an integer of from 1 to 5. r represents an integer of from 0 to 10.

When (5-p) is 2 or greater, $R^2$s may be the same as or different from each other. When (5-q) is 2 or greater, $R^3$s may be the same as or different from each other.

When r is 2 or greater, (—$R^4CR^5$—)s may be the same as or different from each other.

In Formula (3), when $R^2$ is a substituent, examples of the substituent include an alkyl group having from 1 to 12 carbon atoms, an alkenyl group having from 2 to 12 carbon atoms, a hydroxy group, a halogen atom (for example, fluorine, chlorine, bromine, or iodine), and the like.

As the substituent, an alkyl group having from 1 to 6 carbon atoms (for example, a linear or branched alkyl group such as a methyl group, an ethyl group, an n-propyl group, an isopropyl group, an n-butyl group, an isobutyl group, a sec-butyl group, a tert-butyl group, a pentyl group, or a hexyl group) or a hydroxy group is desirable, and a methyl group or a hydroxy group is more desirable, in respect that a resin compound showing superior flexibility after being molded is realized.

In Formula (3), the above description is also applied in the same manner when $R^3$ is a substituent.

In the aromatic compound represented by Formula (3), at least one $R^2$ and at least one $R^3$ are desirably hydroxy groups, in respect that a resin compound showing superior flexibility after being molded is realized.

In Formula (3), each of p and q independently represents an integer of from 1 to 5. Each of p and q desirably independently represents an integer of from 1 to 3, and more desirably independently represents 1 or 2, in respect that a resin compound showing superior flexibility after being molded is realized. Both p and q desirably represent 2 in respect that a resin compound showing excellent flame retardancy after being molded is realized.

In Formula (3), when $R^4$ is a substituent, examples of the substituent include an alkyl group having from 1 to 12 carbon atoms, an alkenyl group having from 2 to 12 carbon atoms, a halogen atom (for example, fluorine, chlorine, bromine, or iodine), and the like.

As the substituent represented by $R^4$, an alkyl group having from 1 to 6 carbon atoms (for example, a linear or branched alkyl group such as a methyl group, an ethyl group, an n-propyl group, an isopropyl group, an n-butyl group, an isobutyl group, a sec-butyl group, a tert-butyl group, a pentyl group, or a hexyl group) is desirable, and a methyl group is more desirable.

The above description is also applied in the same manner when $R^5$ is a substituent.

In Formula (3), each of $R^4$ and $R^5$ desirably independently represents a hydrogen atom or a methyl group.

In Formula (3), r represents an integer of from 0 to 10. r is desirably an integer of from 1 to 6, and more desirably an integer of from 1 to 4, in respect that a resin compound showing superior flame retardancy after being molded is realized.

In two benzene rings of the aromatic compound represented by Formula (3), a hydroxymethyl group is desirably positioned in a meta-position or a para-position with respect to a position to which (—$R^4CR^5$—) is bonded.

Aromatic Compound Represented by Formula (4)

One desirable exemplary embodiment of the aromatic compound is an aromatic compound represented by the following Formula (4).

Formula (4)

In Formula (4), each of $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, and $R^{19}$ independently represents a hydrogen atom or a substituent. Each of d and f independently represents an integer of from 1 to 5, and each of e and g independently represents an integer of from 0 to 5. Here, the sum of d, e, f, and g is 10 or less. Each of h, i, j, and k independently represents an integer of from 0 to 10.

When (5-d) is 2 or greater, $R^6$s may be the same as or different from each other. When (5-e) is 2 or greater, $R^7$s may be the same as or different from each other. When (5-f) is 2 or greater, $R^8$s may be the same as or different from each other. When (5-g) is 2 or greater, $R^9$s may be the same as or different from each other.

When h is 2 or greater, (—$R^{12}CR^{13}$—)s may be the same as or different from each other. When i is 2 or greater, (—$R^{14}CR^{15}$—)s may be the same as or different from each other. When j is 2 or greater, (—$R^{16}CR^{17}$—)s may be the same as or different from each other. When k is 2 or greater, (—$R^{18}CR^{19}$—)s may be the same as or different from each other.

In Formula (4), when $R^6$ is a substituent, examples of the substituent include an alkyl group having from 1 to 12 carbon atoms, an alkenyl group having from 2 to 12 carbon atoms, a hydroxy group, a halogen atom (for example, fluorine, chlorine, bromine, or iodine), and the like.

As the substituent, an alkyl group having from 1 to 6 carbon atoms (for example, a linear or branched alkyl group such as a methyl group, an ethyl group, an n-propyl group, an isopropyl group, an n-butyl group, an isobutyl group, a sec-butyl group, a tert-butyl group, a pentyl group, or a hexyl group) or a hydroxy group is desirable, and a methyl group or a hydroxy group is more desirable, in respect that a resin compound showing superior flexibility after being molded is realized.

In Formula (4), the above description is also applied in the same manner when $R^7$, $R^8$, and $R^9$ are substituents.

In Formula (4), each of d and f independently represents an integer of from 1 to 5. Each of d and f desirably independently represents an integer of from 1 to 3, more desirably independently represents 1 or 2, and even more desirably, both of d and f represent 1, in respect that a resin compound showing superior flexibility after being molded is realized.

In Formula (4), each of e and g independently represents an integer of from 0 to 5. Each of e and g desirably independently represents an integer of from 0 to 4, more desirably independently represents 0 or 1, and even more desirably, both of e and g represent 1, in respect that a resin compound showing superior flexibility after being molded is realized.

In Formula (4), all of d, e, f, and g are desirably 1 in respect that a resin compound showing superior flexibility after being molded in realized.

In Formula (4), when $R^{10}$ is a substituent, examples of the substituent include an alkyl group having from 1 to 12 carbon atoms, an alkenyl group having from 2 to 12 carbon atoms, a halogen atom (for example, fluorine, chlorine, bromine, or iodine), and the like.

As the substituent represented by $R^{10}$, an alkyl group having from 1 to 6 carbon atoms (for example, a linear or branched alkyl group such as a methyl group, an ethyl group, an n-propyl group, an isopropyl group, an n-butyl group, an isobutyl group, a sec-butyl group, a tert-butyl group, a pentyl group, or a hexyl group) is desirable, and a methyl group is more desirable.

The above description is also applied in the same manner when $R^{11}$, $R^{12}$, $R^{13}$, $R^{14}$, $R^{15}$, $R^{16}$, $R^{17}$, $R^{18}$, and $R^{19}$ are substituents.

In Formula (4), each of $R^{10}$, $R^{11}$, $R^{12}$, $R^{13}$, $R^{14}$, $R^{15}$, $R^{16}$, $R^{17}$, $R^{18}$, and $R^{19}$ desirably independently represents a hydrogen atom or a methyl group.

In Formula (4), each of h, i, j, and k independently represents an integer of from 0 to 10. Each of h, i, j, and k desirably independently represents an integer of from 0 to 5, more desirably independently represents 0 or 1, and even more desirably all represents 0, in respect that a resin compound showing superior flexibility after being molded is realized.

In four benzene rings of the aromatic compound represented by Formula (4), a hydroxymethyl group is desirably positioned in a meta-position or a para-position with respect to a position to which (—$R^{12}CR^{13}$—), (—$R^{14}CR^{15}$—), (—$R^{16}CR^{17}$—), and (—$R^{18}CR^{19}$—) are bonded respectively.

Specific examples of the aromatic compound include the following compounds.

Exemplary Compound (1)

Exemplary Compound (2)

Exemplary Compound (3)

Exemplary Compound (4)

Exemplary Compound (5)

Exemplary Compound (6)

Exemplary Compound (7)

Exemplary Compound (8)

Exemplary Compound (9)

Exemplary Compound (10)

Exemplary Compound (11)

Exemplary Compound (12)

Exemplary Compound (13)

The number of the aromatic rings of the aromatic compound is desirably from 1 to 4, and in the range of from 1 to 4, the greater the number, the more desirable, in respect that a resin compound showing superior flexibility after being molded is realized.

The number of the hydroxymethyl groups of the aromatic compound is desirably from 1 to 4, and in the range of from 1 to 4, the greater the number, the more desirable, in respect that a resin compound that shows superior flexibility after being molded, is not easily thermally decomposed, and shows excellent thermotolerance is realized.

The aromatic compound is desirably bisphenol in respect that a resin compound showing superior flexibility after being molded is realized.

Among the Exemplary Compounds (1) to (13), as the aromatic compound, Examples Compounds (1) to (6) are desirable, and Exemplary Compounds (5) and (6) are more desirable, in respect that a resin compound showing superior flexibility after being molded is realized.

The aromatic compound represented by Formula (1) is synthesized by, for example, a reaction between an aromatic compound having a hydroxyphenyl group and ketone, similarly to a case of synthesizing bisphenol in general.

Method of Preparing Resin Compound

The resin compound according to the present exemplary embodiment is prepared by, for example, melting and kneading a mixture of aliphatic polyester and/or aliphatic polyamide and the aromatic compound.

Known methods are exemplified as the method of melting and kneading, and specific examples thereof include methods using a twin-screw extruder, a Henschel mixer, a Banbury mixer, a single-screw extruder, a multi-screw extruder, a co-kneader, and the like.

Resin Composition

The resin composition according to the present exemplary embodiment contains the resin compound according to the present exemplary embodiment and a condensed phosphoric acid ester.

With the resin composition according to the present exemplary embodiment, due to the above composition, a resin composition showing superior mechanical strength after being molded is realized, compared to a case where the resin composition contains a flame retardant which is not a condensed phosphoric acid ester among flame retardants known in the related art. Though unclear, the reason is considered to be as below.

It is considered that in the resin compound according to the present exemplary embodiment, the aliphatic polyester and/or the aliphatic polyamide and the aromatic compound are linked with a covalent bond and the pseudo-crosslinked structure, and that in the inside of the resin compound and between the resin compounds, there is a gap that the condensed phosphoric acid ester enters. It is also considered that the condensed phosphoric acid ester enters the gap, thereby being distributed throughout the entire resin composition. Consequently, it is considered that the resin composition according to the present exemplary embodiment maintains the original flexibility of the resin compound and realizes mechanical strength after being molded.

In addition, it is considered that the resin compound according to the present exemplary embodiment realizes flame retardancy since the compound contains the condensed phosphoric acid ester.

Condensed Phosphoric Acid Ester

Examples of the condensed phosphoric acid ester include aromatic condensed phosphoric acid esters of a bisphenol A type, a biphenylene type, an isophthalic type, and the like. Specific examples thereof include condensed phosphoric acid esters represented by the following Formulae (A) and (B).

Formula (A)

Formula (B)

In Formula (A), each of $Q^1$, $Q^2$, $Q^3$, and $Q^4$ independently represents a hydrogen atom or an alkyl group having from 1 to 6 carbon atoms; each of $Q^5$, $Q^6$, $Q^7$, and $Q^8$ independently represents a hydrogen atom or a methyl group; each of m1, m2, m3, and m4 independently represents an integer of from 0 to 3; each of m5 and m6 independently represents an integer of from 0 to 2; and n1 represents an integer of from 0 to 10.

In Formula (B), each of $Q^9$, $Q^{10}$, $Q^{11}$, and $Q^{12}$ independently represents a hydrogen atom or an alkyl group having from 1 to 6 carbon atoms; $Q^{13}$ represents a hydrogen atom or a methyl group; each of m7, m8, m9, and m10 independently represents an integer of from 0 to 3; m11 represents an integer of from 0 to 4; and n2 represents an integer of from 0 to 10.

The condensed phosphoric acid ester may be a synthetic product or a commercially available product. Examples of the commercially available product of the condensed phosphoric acid ester include "PX200", "PX201", "PX202", and "CR741" which are commercially available products manufactured by DAIHACHI CHEMICAL INDUSTRY CO, LTD., "ADEKA STAB FP2100" and "ADEKA STAB FP2200" which are commercially available products manufactured by ADEKA CORPORATION, and the like.

Among these, the condensed phosphoric acid ester is desirably at least one kind selected from a compound represented by the following Structural Formula (C) ("PX200" manufactured by DAIHACHI CHEMICAL INDUSTRY CO, LTD.) and a compound represented by the following Structural Formula (D) ("CR741" manufactured by DAIHACHI CHEMICAL INDUSTRY CO, LTD.), in respect that the mechanical strength and the flame retardancy are markedly exhibited after molding when the above compound is combined with the resin compound contained in the resin composition.

The resin composition according to the present exemplary embodiment may contain a resin other than the aliphatic polyester and/or the aliphatic polyamide. Here, the other resin is mixed within a range that does not deteriorate moldability in a molding machine.

Examples of the other resin include thermoplastic resins known in the related art. Specific examples thereof include a polycarbonate resin; a polypropylene resin; an aromatic poly- Structural Formula (C)

Structural Formula (D)

The amount of the condensed phosphoric acid ester contained is desirably from 5% by weight to 30% by weight, and more desirably from 10% by weight to 15% by weight, based on the total amount of the polymer, which is at least selected from the aliphatic polyester and the aliphatic polyamide, constituting the resin compound contained in the resin composition. If the amount of the condensed phosphoric acid ester contained is 5% by weight or more, the flame retardancy of the obtained resin-molded product becomes superior. On the other hand, if the amount of the condensed phosphoric acid ester contained is 30% by weight or less, the mechanical strength of the obtained resin-molded product becomes superior.

Other Components

The resin composition according to the present exemplary embodiment may contain other components if necessary. The amount of other components contained is desirably from 0% by weight to 10% by weight, and more desirably from 0% by weight to 5% by weight, based on the entire resin composition. Herein, "0% by weight" means that other components are not contained.

Examples of other components include a compatibilizer, a plasticizer, an antioxidant, a mold release agent, a light resistant agent, a weather resistant agent, a flame retardant, a colorant, a pigment, a modifier, a drip preventing agent, an antistatic agent, a hydrolysis preventing agent, a filler, a reinforcing agent (such as glass fiber, carbon fiber, talc, clay, mica, glass flakes, milled glass, glass beads, crystalline silica, alumina, silicon nitride, alumina nitride, and boron nitride), and the like.

ester resin; a polyolefin resin; a polyester carbonate resin; a polyphenylene ether resin; a polyphenylene sulfide resin; a polysulfone resin; a polyether sulfone resin; a polyarylene resin; a polyether imide resin; a polyacetal resin; a polyvinyl acetal resin; a polyketone resin; a polyether ketone resin; a polyether ether ketone resin; a polyaryl ketone resin; a polyether nitrile resin; a liquid crystal resin; a polybenzimidazole resin; a polyparabanic acid resin; a vinyl-based polymer or copolymer resin obtained by polymerizing or copolymerizing one or more kinds of vinyl monomers selected from a group consisting of an aromatic alkenyl compound, methacrylic acid ester, acrylic acid ester, and a vinyl cyanide compound; a diene-aromatic alkenyl compound copolymer resin; a vinyl cyanide-diene-aromatic alkenyl compound copolymer resin; an aromatic alkenyl compound-diene-vinyl cyanide-N-phenyl maleimide copolymer resin; a vinyl cyanide-(ethylene-diene-propylene (EPDM))-aromatic alkenyl compound copolymer resin; polyolefin; a vinyl chloride resin; a chlorinated vinyl chloride resin; and the like.

These resins may be used alone, or two or more kinds thereof may be used concurrently.

(Method of Preparing Resin Composition)

The resin composition according to the present exemplary embodiment is prepared by, for example, melting and kneading a mixture including the above respective components.

Known methods are exemplified as the method of melting and kneading, and specific examples thereof include methods using a twin-screw extruder, a Henschel mixer, a Banbury mixer, a single-screw extruder, a multi-screw extruder, a co-kneader, and the like.

Resin-Molded Product

The resin-molded product according to the present exemplary embodiment is constituted with the resin compound or the resin composition according to the present exemplary embodiment. That is, the resin-molded product according to the present exemplary embodiment is constituted with the same composition as that of the resin compound or the resin composition according to the present exemplary embodiment.

Specifically, the resin-molded product according to the present exemplary embodiment is obtained by molding the resin compound or the resin composition according to the present exemplary embodiment. For the molding method, for example, injection molding, extrusion molding, blow molding, heat press molding, calendar molding, coating molding, cast molding, dipping molding, vacuum molding, transfer molding, and the like may be applied.

It is considered that in the resin compound and the resin composition as the material of the resin-molded product according to the present exemplary embodiment, the aliphatic polyester and/or the aliphatic polyamide and the aromatic compound are flexibly linked with the pseudo-crosslinked structure. Consequently, the resin compound and the resin composition as the material have thermoplasticity, and accordingly, molding is realized by injection molding. The resin-molded product according to the present exemplary embodiment is arbitrarily shaped by injection molding.

The injection molding may be performed using, for example, commercially available devices such as NEX150 and NEX70000 manufactured by Nissei Plastic Industrial Co., Ltd. and SE50D manufactured by TOSHIBA MACHINE CO, LTD.

At this time, the cylinder temperature is desirably from 170° C. to 280° C., and more desirably from 180° C. to 270° C. In addition, the mold temperature is desirably from 40° C. to 110° C., and more desirably from 50° C. to 110° C.

The resin-molded product according to the present exemplary embodiment is suitably used for purposes such as electronic and electric instruments, home appliances, containers, vehicle interior materials. More specifically, the resin-molded product is used for chassis and various parts of home appliances, electronic and electric instruments, or the like; wrapping films, storage cases of CD-ROMs, DVDs, or the like; tableware; food trays; beverage bottles; drug packaging materials; and the like. Among these, the resin-molded product is suitable for parts of electronic and electric instruments.

Figure 1:
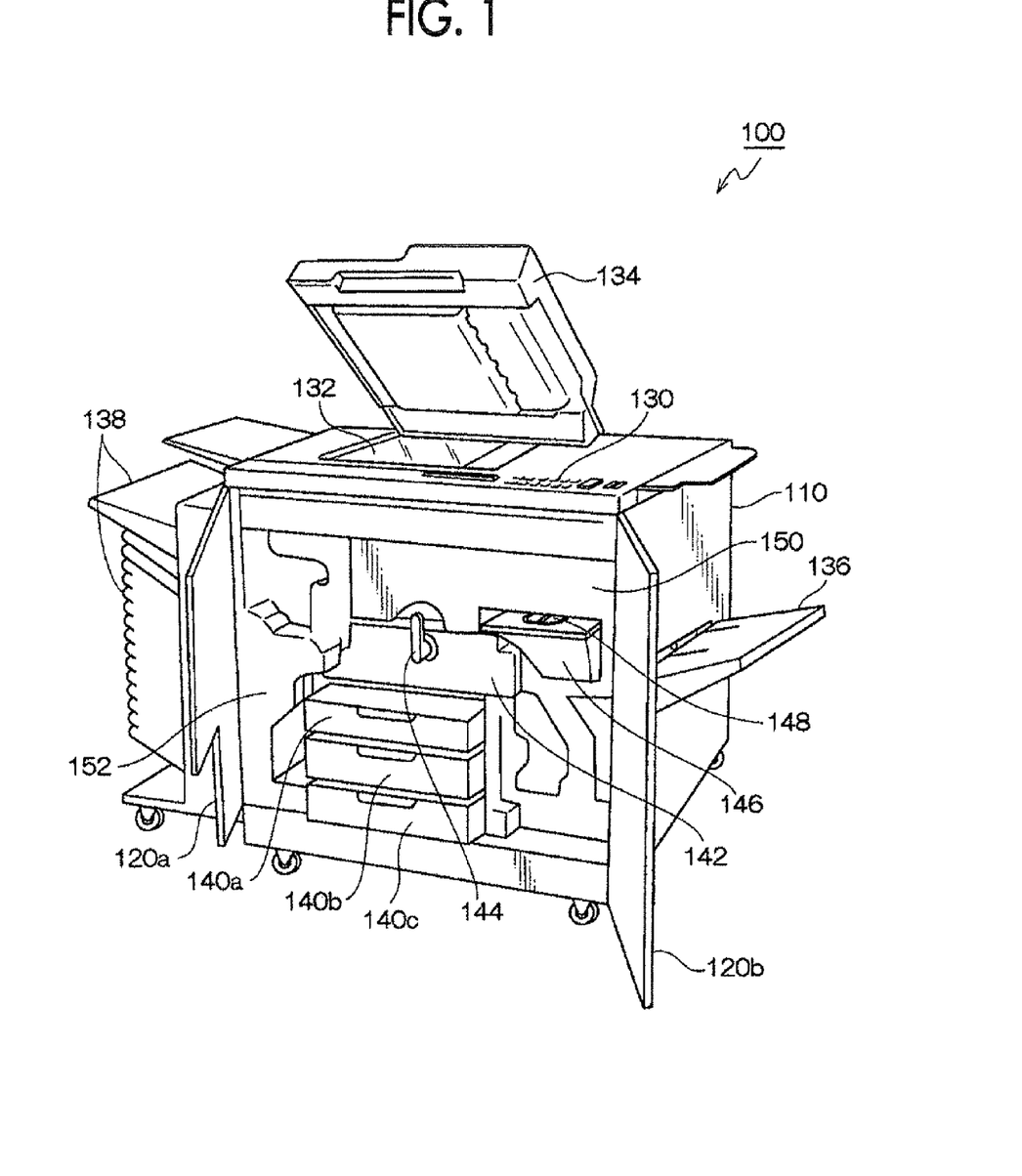
FIG. 1 is a schematic view showing an example of parts of an electronic and electric instrument that includes the resin-molded product according to the present exemplary embodiment.

FIG. 1 is an exterior perspective view showing the front view of an image forming apparatus as an example of parts of an electronic and electric instrument including the resin-molded product according to the present exemplary embodiment.

An image forming apparatus 100 of FIG. 1 includes front covers 120a and 120b on the front surface of a main device 110. These front covers 120a and 120b are freely opened and closed such that an operator operates the inside of the apparatus. Therefore, the operator replenishes toners when the toners are used up, replaces process cartridges used up, or removes jammed papers when a paper jam occurs in the apparatus. FIG. 1 shows the apparatus in a state where the front covers 120a and 120b are opened.

The top surface of the main device 110 is provided with an operation panel 130 in which all conditions relating to image formation, such as paper size and number of copies, are input by the operator's operation, and a copy glass 132 on which a document to be read is disposed. In addition, the top portion of the main device 110 is provided with an automatic document feeding device 134 that feeds a document onto the copy glass 132. The main device 110 also includes an image reader that obtains image data showing the document image by scanning the document image disposed on the copy glass 132. The document data obtained by the image reader is transmitted to an image forming unit through a control portion. The image reader and the control portion are accommodated inside a chassis 150 that constitutes a portion of the main device 110. The image forming unit is provided to the chassis 150 as an attachable and detachable process cartridge 142. The process cartridge 142 is detached or attached when an operation lever 144 is turned.

A toner accommodating portion 146 is provided to the chassis 150 of the main device 110, and a toner is replenished from a toner supplying port 148. The toner accommodated in the toner accommodating portion 146 is supplied to a developing device.

Meanwhile, the lower portion of the main device 110 is provided with paper storage cassettes 140a, 140b, and 140c. In the main device 110, plural transport rollers constituted with a pair of rollers are arranged, whereby a transport path is formed in which paper in the paper storage cassette is transported to the image forming unit in the upper portion. The papers in each paper storage cassette are taken out sheet by sheet by a paper taking-out mechanism disposed near the end of the transport path, and transported to the transport path. In addition, a manual paper supplying portion 136 is provided in the lateral side of the main device 110, so paper is also supplied from this portion.

The papers in which an image has been formed by the image forming unit are sequentially transported to a portion between two fixing rolls that are supported by a chassis 152 constituting a portion of the main device 110 and contact each other, and then discharged outside the main device 110. In the main device 110, plural paper discharge portions 138 are provided to the opposite side of the side where the paper supplying portion 136 is provided, and papers in which images have been formed are discharged to these paper discharge portions.

In the image forming apparatus 100, the resin-molded product according to the exemplary embodiment is used for, for example, the front covers 120a and 120b, the exterior of the process cartridge 142, and the chassis 150 and 152.

EXAMPLES

Hereinafter, the present invention will be described in detail based on examples, but the present invention is not limited to the examples.

Examples 1 to 22 and Comparative Examples 1 to 10

Preparation of Resin Compound

Materials are mixed in the compositional ratios shown in Tables 1 and 2 (the numerical values in Tables 1 and 2 are based on parts by weight) and kneaded using a twin-screw extruder (manufactured by TOSHIBA MACHINE CO, LTD., TEM3000) at a cylinder temperature as the kneading temperature (° C.) shown in Tables 1 and 2, followed by cooling and pelletizing, thereby obtaining pellets of the resin compound.

Here, in Comparative Examples 7 to 10, kneading is performed while electron beam irradiation is performed under the conditions of electron beam irradiation shown in Table 2.

TABLE 1

| | | Aliphatic polyester | | | Aliphatic polyamide | Aromatic compound | | | | | | | | | | Kneading temperature [°C] |
|---|---|---|---|---|---|---|---|---|---|---|---|---|---|---|---|---|
| | | Polylactic acid | | Polyhydroxy-butyrate | Polyamide 11 | Exemplary Compound of aromatic compound represented by Formula (1) | | | | | | | | | Aromatic compound | |
| | Compound No. | TERRAMAC TE2000 | 3051D | Biopol D400G | Rilsan | (1) | (2) | (3) | (4) | (5) | (6) | (8) | (9) | (11) | (14) | |
| Example 1 | 1 | 100 | — | — | — | 1 | — | — | — | — | — | — | — | — | — | 180 |
| Example 2 | 2 | 100 | — | — | — | — | 1 | — | — | — | — | — | — | — | — | 180 |
| Example 3 | 3 | 100 | — | — | — | — | — | 1 | — | — | — | — | — | — | — | 180 |
| Example 4 | 4 | 100 | — | — | — | — | — | — | 1 | — | — | — | — | — | — | 180 |
| Example 5 | 5 | 100 | — | — | — | — | — | — | — | 1 | — | — | — | — | — | 180 |
| Example 6 | 6 | 100 | — | — | — | — | — | — | — | — | 1 | — | — | — | — | 180 |
| Example 7 | 7 | — | 100 | — | — | — | — | — | — | — | 1 | — | — | — | — | 180 |
| Example 8 | 8 | — | — | 100 | — | — | — | — | — | — | 1 | — | — | — | — | 160 |
| Example 9 | 9 | 100 | — | — | — | — | — | — | — | — | 0.1 | — | — | — | — | 180 |
| Example 10 | 10 | 100 | — | — | — | — | — | — | — | — | 5 | — | — | — | — | 185 |
| Example 11 | 11 | 100 | — | — | — | — | — | — | — | — | — | 1 | — | — | — | 180 |
| Example 12 | 12 | 100 | — | — | — | — | — | — | — | — | — | — | 1 | — | — | 180 |
| Example 13 | 13 | 100 | — | — | — | — | — | — | — | — | — | — | — | 1 | — | 180 |
| Example 14 | 14 | — | — | — | 100 | 1 | — | — | — | — | — | — | — | — | — | 200 |
| Example 15 | 15 | — | — | — | 100 | — | 1 | — | — | — | — | — | — | — | — | 200 |
| Example 16 | 16 | — | — | — | 100 | — | — | 1 | — | — | — | — | — | — | — | 200 |
| Example 17 | 17 | — | — | — | 100 | — | — | — | 1 | — | — | — | — | — | — | 200 |
| Example 18 | 18 | — | — | — | 100 | — | — | — | — | 1 | — | — | — | — | — | 200 |
| Example 19 | 19 | — | — | — | 100 | — | — | — | — | — | 1 | — | — | — | — | 200 |
| Example 20 | 20 | — | — | — | 100 | — | — | — | — | — | 0.1 | — | — | — | — | 200 |
| Example 21 | 21 | — | — | — | 100 | — | — | — | — | — | 5 | — | — | — | — | 210 |
| Example 22 | 22 | — | — | — | 100 | — | — | — | — | — | — | 1 | — | — | — | 200 |
| Comparative Example 1 | C1 | 100 | — | — | — | — | — | — | — | — | 0 | — | — | — | — | 180 |
| Comparative Example 2 | C2 | 100 | — | — | — | — | — | — | — | — | 5.5 | — | — | — | — | 185 |
| Comparative Example 3 | C3 | — | — | — | 100 | — | — | — | — | — | 0 | — | — | — | — | 200 |
| Comparative Example 4 | C4 | — | — | — | 100 | — | — | — | — | — | 5.5 | — | — | — | — | 210 |
| Comparative Example 5 | C5 | 100 | — | — | — | — | — | — | — | — | — | — | — | — | 1 | 180 |
| Comparative Example 6 | C6 | — | — | — | 100 | — | — | — | — | — | — | — | — | — | 1 | 200 |

TABLE 2

| | | Aliphatic polyester | | Cyanurate compound | | Kneading temperature [°C] | Electron beam irradiation | |
|---|---|---|---|---|---|---|---|---|
| | | Polylactic acid | Polyhydroxybutyrate | | | | Accelerating voltage [kV] | Irradiation dose [MRad] |
| | Compound No. | TERRAMAC TE2000 | Biopol D400G | FANCRYL FA-731A | Triallyl cyanurate | | | |
| Comparative Example 7 | C7 | 100 | — | 3 | — | 150 | 200 | 1 |
| Comparative Example 8 | C8 | 100 | — | — | 3 | 150 | 200 | 1 |
| Comparative Example 9 | C9 | — | 100 | 3 | — | 150 | 200 | 1 |
| Comparative Example 10 | C10 | — | 100 | — | 3 | 150 | 200 | 1 |

Identification of Resin Compound

For each example, an absorption spectrum is measured using an infrared absorption spectrum measuring instrument (manufactured by Shimadzu Corporation, IRAffinity-1) to identify the resin compound. As examples of the absorption spectrum, FIG. 2 shows an absorption spectrum of the resin compound according to Example 5, and FIG. 3 shows an absorption spectrum of the resin compound according to Example 18.

Figure 2:
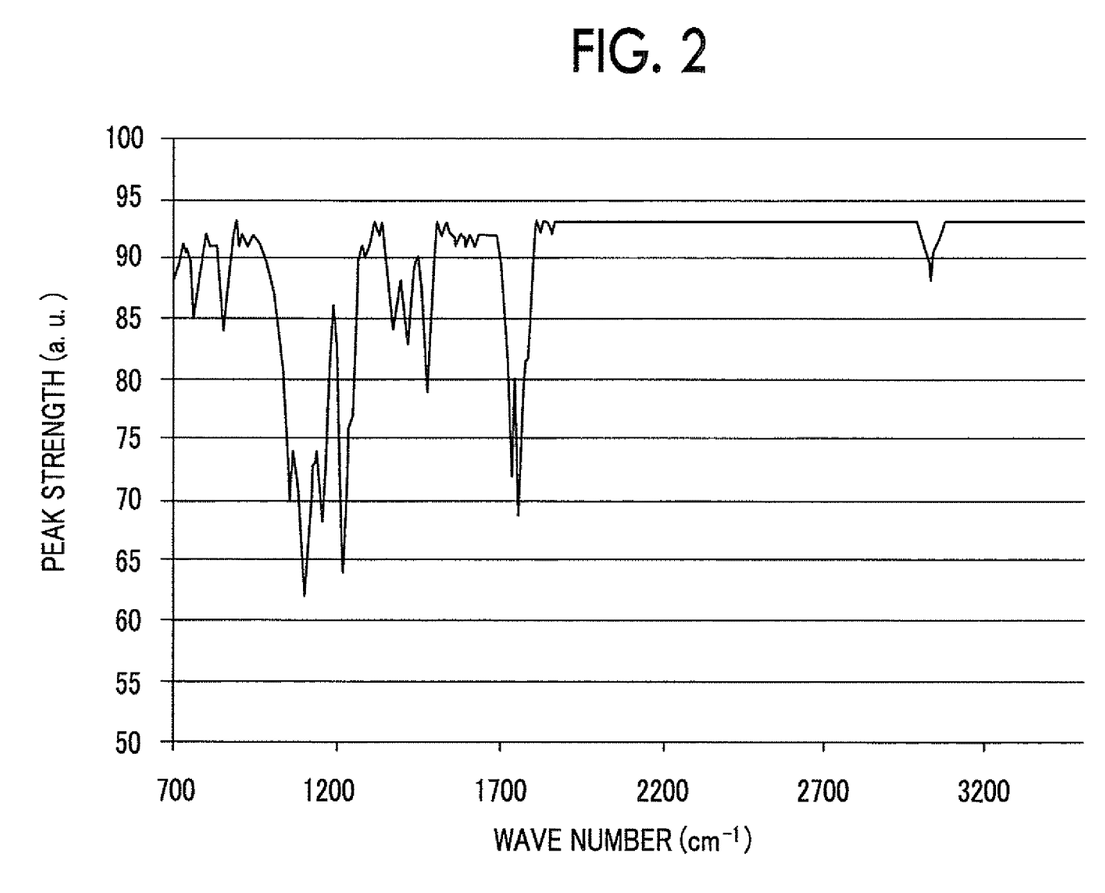
FIG. 2 is a view showing an absorption spectrum of a resin compound obtained in Example 5.

As shown in FIG. 2, peaks that are generated since the Exemplary Compound (5) is bonded to polylactic acid are observed near 740 cm$^{-1}$ and 3010 cm$^{-1}$ other than the absorption peak of polylactic acid. From this result, it is understood that a resin compound in which the Exemplary Compound (5) is bonded to polylactic acid has been obtained. In addition, from the ratio between the peak derived from polylactic acid and the peak derived from the aromatic compound, it is understood that a resin compound having the same compositional ratio as the mixing ratio has been obtained.

Figure 3:
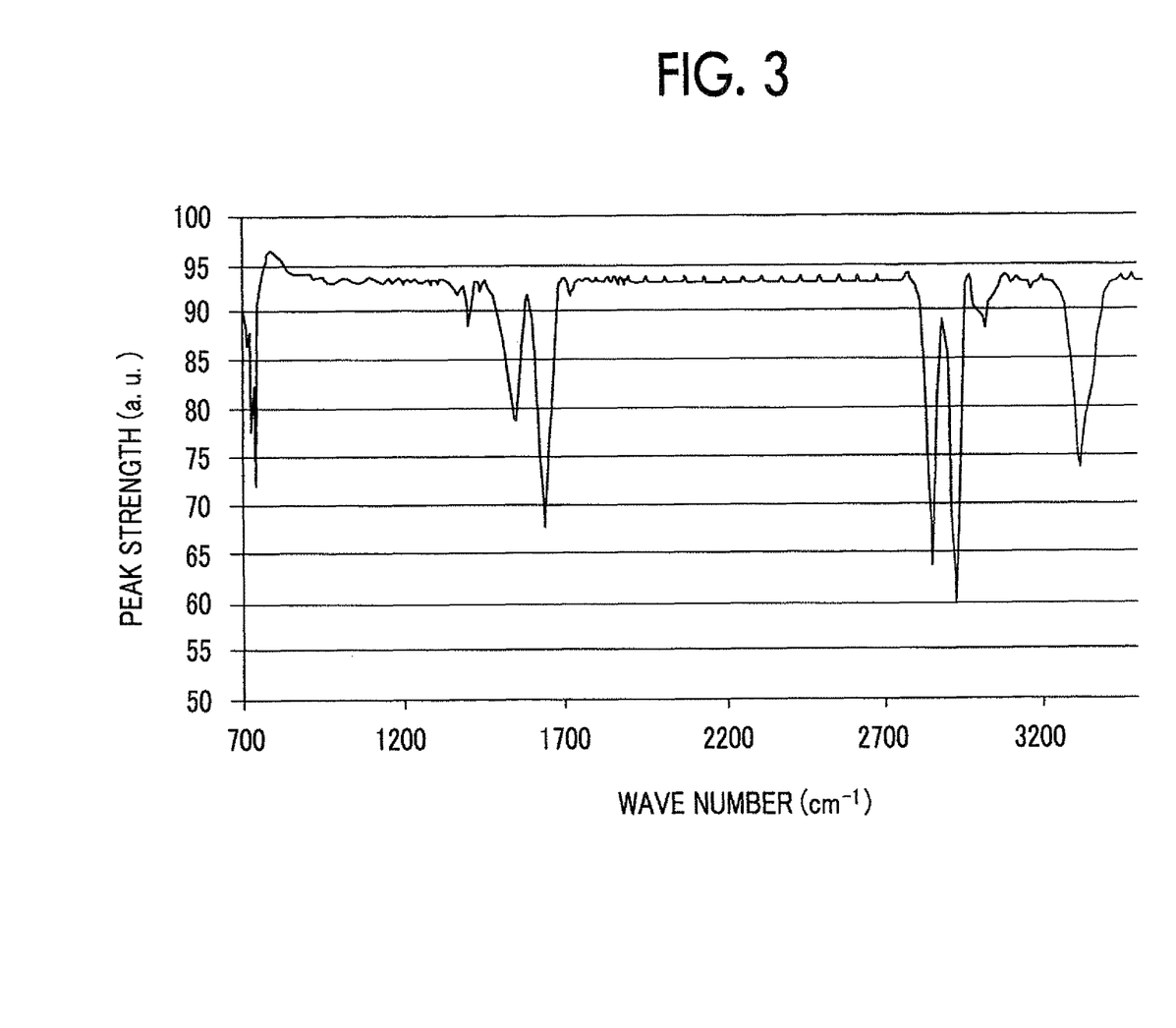
FIG. 3 is a view showing an absorption spectrum of a resin compound obtained in Example 18.

As shown in FIG. 3, peaks that are generated since the Exemplary Compound (5) is bonded to polyamide 11 are observed near 730 cm$^{-1}$ and 3010 cm$^{-1}$ other than the absorption peak of the polyamide 11. From this result, it is understood that a resin compound in which the Exemplary Compound (5) is bonded to the polyamide 11 has been obtained. In addition, from the ratio between the peak derived from the polyamide 11 and the peak derived from the aromatic compound, it is understood that a resin compound having the same compositional ratio as the mixing ratio has been obtained.

Examples 101 to 114

Preparation of Resin Composition

Materials are mixed in the compositional ratios shown in Table 3 (the numerical values in Table 3 are based on parts by weight) and kneaded using a twin-screw extruder (manufactured by TOSHIBA MACHINE CO, LTD., TEM3000) at a cylinder temperature as the kneading temperature (° C.) shown in Table 3, followed by cooling and pelletizing, thereby obtaining pellets of the resin composition.

Evaluation

The respective test pieces obtained as above are evaluated as follows, and the results are shown in Tables 4 and 5.

—Tensile Elongation at Break—

By using the ISO multipurpose dumbbell test piece, tensile elongation at break (%) is measured according to ISO527-1, 2 by a material testing machine (manufactured by TOYO SEIKI SEISAKU-SHO, LTD., Instron VR6), thereby evaluating flexibility.

—Bending Breaking Strain—

By using the ISO multipurpose dumbbell test piece, bending breaking strain (%) is measured according to ISO178 by a material testing machine (manufactured by TOYO SEIKI SEISAKU-SHO, LTD., Instron VR6), thereby evaluating flexibility.

—Surface Impact Strength—

By using the D2 test piece, surface impact strength (J) at a high-speed is measured according to ISO6603 by an impact measuring instrument (manufactured by Mitsui Research Center, Inc.).

TABLE 3

| | Composition No. | Aliphatic polyester | | Aliphatic polyamide | Aromatic compound | | Condensed phosphoric acid ester | | Flame retardant | Kneading temperature [° C.] |
| | | Polylactic acid TERRAMAC TE2000 | Polyhydroxy-butyrate Biopol D400G | Polyamide 11 Rilsan | Exemplary Compound (5) | Exemplary Compound (6) | PX200 | CR741 | AP422 | |
|---|---|---|---|---|---|---|---|---|---|---|
| Example 101 | 101 | 100 | — | — | 1 | — | 10 | — | — | 170 |
| Example 102 | 102 | 100 | — | — | 1 | — | — | 10 | — | 170 |
| Example 103 | 103 | 100 | — | — | — | 1 | 10 | — | — | 170 |
| Example 104 | 104 | 100 | — | — | — | 1 | — | 10 | — | 170 |
| Example 105 | 105 | 100 | — | — | — | 1 | 5 | — | — | 180 |
| Example 106 | 106 | 100 | — | — | — | 1 | — | 5 | — | 180 |
| Example 107 | 107 | 100 | — | — | — | 1 | 30 | — | — | 170 |
| Example 108 | 108 | 100 | — | — | — | 1 | — | 30 | — | 170 |
| Example 109 | 109 | — | 100 | — | — | 1 | 10 | — | — | 160 |
| Example 110 | 110 | — | — | 100 | — | 1 | 10 | — | — | 180 |
| Example 111 | 111 | 100 | — | — | 1 | — | — | — | 10 | 170 |
| Example 112 | 112 | 100 | — | — | — | 1 | — | — | 10 | 170 |
| Example 113 | 113 | — | — | 100 | 1 | — | — | — | 10 | 180 |
| Example 114 | 114 | — | — | 100 | — | 1 | — | — | 10 | 180 |

Examples 201 to 222, Comparative Examples 201 to 210, and Examples 301 to 314

The pellets of the resin compounds or the resin compositions obtained as above are subjected to injection molding using an injection molding machine (manufactured by Nissei Plastic Industrial Co., Ltd., NEX150) at the cylinder temperature (° C.) and the mold temperature (° C.) of the molding conditions shown in Tables 4 and 5. In this manner, an ISO multipurpose dumbbell test piece (a length of a portion to be tested of 100 mm, a width of 10 mm, and a thickness of 4 mm), a UL test piece (a length of 125 mm, a width of 13 mm, and a thickness of 1.6 mm), and a D2 test piece (a length of 60 mm, a width of 60 mm, and a thickness of 2 mm) are obtained.

—Flame Retardancy—

By using the UL test piece, flame retardancy is evaluated according to a V test of UL94. As the evaluation criteria, the test pieces are marked with V-0, V-1, and V-2 in order from a test piece showing superior flame retardancy, and when the flame retardancy is inferior to V-2, that is, when fire spreads on a test piece, this is marked V-Not.

—Deflection Temperature Under Load—

By using the ISO multipurpose test piece, deflection temperature under load (° C.) is measured according to ISO75 by an HDT measuring instrument (TOYO SEIKI SEISAKU-SHO, LTD., HDT-3) under a condition of a load of 1.8 MPa, thereby evaluating heat resistance.

TABLE 4

| | | Molding condition | | Physical property evaluation | | | | |
| --- | --- | --- | --- | --- | --- | --- | --- | --- |
| | | | | Tensile | Bending | Surface | | Deflection |
| | Compound No. | Cylinder temperature [° C.] | Mold temperature [° C.] | elongation at break [%] | breaking strain [%] | impact strength [J] | Flame retardancy | temperature under load [° C.] |
| Example 201 | 1 | 185 | 40 | 12 | 8 | 9 | V-2 | 62 |
| Example 202 | 2 | 185 | 40 | 10 | 8 | 9 | V-2 | 61 |
| Example 203 | 3 | 185 | 40 | 18 | 10 | 12 | V-2 | 60 |
| Example 204 | 4 | 185 | 40 | 22 | 12 | 13 | V-2 | 60 |
| Example 205 | 5 | 185 | 40 | 14 | 9 | 11 | V-1 | 62 |
| Example 206 | 6 | 185 | 40 | 25 | 14 | 16 | V-2 | 61 |
| Example 207 | 7 | 185 | 40 | 21 | 12 | 14 | V-2 | 60 |
| Example 208 | 8 | 170 | 40 | 10 | 8 | 8 | V-2 | 60 |
| Example 209 | 9 | 185 | 40 | 22 | 11 | 10 | V-2 | 60 |
| Example 210 | 10 | 190 | 40 | 23 | 11 | 11 | V-2 | 62 |
| Example 211 | 11 | 185 | 40 | 10 | 7 | 9 | V-2 | 58 |
| Example 212 | 12 | 185 | 40 | 10 | 9 | 12 | V-2 | 54 |
| Example 213 | 13 | 185 | 40 | 12 | 9 | 12 | V-2 | 59 |
| Example 214 | 14 | 210 | 60 | 40 | 20 | 18 | V-2 | 62 |
| Example 215 | 15 | 210 | 60 | 38 | 19 | 14 | V-2 | 60 |
| Example 216 | 16 | 210 | 60 | 42 | 22 | 20 | V-2 | 60 |
| Example 217 | 17 | 210 | 60 | 41 | 22 | 20 | V-2 | 62 |
| Example 218 | 18 | 210 | 60 | 43 | 22 | 21 | V-2 | 62 |
| Example 219 | 19 | 210 | 60 | 48 | 24 | 26 | V-2 | 60 |
| Example 220 | 20 | 210 | 60 | 37 | 17 | 15 | V-2 | 61 |
| Example 221 | 21 | 220 | 60 | 38 | 18 | 15 | V-2 | 62 |
| Example 222 | 22 | 210 | 60 | 41 | 19 | 18 | V-2 | 58 |
| Comparative Example 201 | C1 | 185 | 40 | 3 | 0.5 | 4 | V-Not | 54 |
| Comparative Example 202 | C2 | 190 | 40 | 0.5 | 0.5 | 8 | V-Not | 64 |
| Comparative Example 203 | C3 | 210 | 60 | 20 | 15 | 18 | V-Not | 42 |
| Comparative Example 204 | C4 | 220 | 60 | 5 | 4 | 12 | V-Not | 55 |
| Comparative Example 205 | C5 | 185 | 40 | 4 | 0.5 | 6 | V-Not | 58 |
| Comparative Example 206 | C6 | 210 | 60 | 5 | 4 | 8 | V-Not | 55 |
| Comparative Example 207 | C7 | 160 | 40 | 2 | 0.6 | 0.8 | V-Not | 58 |
| Comparative Example 208 | C8 | 160 | 40 | 2 | 0.5 | 0.7 | V-Not | 56 |
| Comparative Example 209 | C9 | 160 | 40 | 2 | 0.3 | 0.7 | V-Not | 42 |
| Comparative Example 210 | C10 | 160 | 40 | 1 | 0.3 | 0.6 | V-Not | 41 |

From the above results, it is understood that in similar compositions, the resin compounds according to the examples containing a specific aromatic compound at a specific compositional ratio show superior tensile elongation at break, bending breaking strain, and surface impact strength (among these, the bending breaking strain is particularly superior) and show superior flexibility after being molded, compared to the resin compounds according to comparative examples not containing the specific aromatic compound at the specific compositional ratio.

TABLE 5

| | | Molding condition | | Physical property evaluation | | | |
| --- | --- | --- | --- | --- | --- | --- | --- |
| | | | | Tensile | Bending | Surface | |
| | Composition No. | Cylinder temperature [° C.] | Mold temperature [° C.] | elongation at break [%] | breaking strain [%] | impact strength [J] | Flame retardancy |
| Example 301 | 101 | 170 | 40 | 18 | 8 | 15 | V-0 |
| Example 302 | 102 | 170 | 40 | 14 | 10 | 14 | V-0 |
| Example 303 | 103 | 170 | 40 | 22 | 12 | 14 | V-1 |
| Example 304 | 104 | 170 | 40 | 23 | 14 | 18 | V-1 |
| Example 305 | 105 | 180 | 40 | 25 | 13 | 15 | V-2 |
| Example 306 | 106 | 180 | 40 | 25 | 14 | 16 | V-2 |
| Example 307 | 107 | 170 | 40 | 20 | 10 | 10 | V-1 |
| Example 308 | 108 | 170 | 40 | 22 | 10 | 12 | V-1 |
| Example 309 | 109 | 160 | 40 | 12 | 8 | 8 | V-0 |
| Example 310 | 110 | 180 | 60 | 20 | 20 | 15 | V-1 |
| Example 311 | 111 | 170 | 40 | 6 | 7 | 9 | V-1 |
| Example 312 | 112 | 170 | 40 | 6 | 8 | 8 | V-2 |
| Example 313 | 113 | 180 | 80 | 8 | 9 | 10 | V-1 |
| Example 314 | 114 | 180 | 80 | 7 | 8 | 10 | V-2 |

From the above results, it is understood that in similar compositions, the resin compositions according to Examples 301 to 310 containing a condensed phosphoric acid ester as a flame retardant show superior tensile elongation at break, bending breaking strain, and surface impact strength (among these, the tensile elongation at break is particularly superior) and show superior mechanical strength after being molded, compared to the resin compositions according to Examples 311 to 314 containing a flame retardant other than the condensed phosphoric acid ester.

The details of the materials shown in the respective tables are described herein.

—Aliphatic Polyester—

Polylactic acid: "TERRAMAC TE2000" manufactured by UNITIKA, LTD.

Polylactic acid: "3051D" manufactured by NatureWorks LLC.

Polyhydroxybutyrate: "Biopol D400G" manufactured by Monsanto Japan Limited.

—Aliphatic Polyamide—

Polyamide 11: "Rilsan" manufactured by ARKEMA.

—Aromatic Compound—

Exemplary Compound (1) described above: an aromatic compound represented by Formula (1)

Exemplary Compound (2) described above: an aromatic compound represented by Formula (1)

Exemplary Compound (3) described above: an aromatic compound represented by Formula (1)

Exemplary Compound (4) described above: an aromatic compound represented by Formula (1)

Exemplary Compound (5) described above: an aromatic compound represented by Formula (1)

Exemplary Compound (6) described above: an aromatic compound represented by Formula (1)

Exemplary Compound (8) described above: an aromatic compound represented by Formula (1)

Exemplary Compound (9) described above: an aromatic compound represented by Formula (1)

Exemplary Compound (11) described above: an aromatic compound represented by Formula (1)

The following aromatic compound (14)

Aromatic compound (14)

—Cyanurate Compound—

"Fancryl FA-731A" manufactured by Hitachi Chemical Co., Ltd.: the following cyanurate compound (1)

Triallyl cyanurate: the following cyanurate compound (2)

Cyanurate compound (1)

Cyanurate compound (2)

—Condensed Phosphoric Acid Ester

The above-described compound represented by Structural Formula (C): "PX200" manufactured by DAIHACHI CHEMICAL INDUSTRY CO, LTD.

The above-described compound represented by Structural Formula (D): "CR741" manufactured by DAIHACHI CHEMICAL INDUSTRY CO, LTD.

—Flame Retardant—

Ammonium polyphosphate: "EXOLIT AP422" manufactured by Clariant Japan

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A resin compound, comprising:
a reaction product of (A) aliphatic polyester and/or aliphatic polyamide and (B) an aromatic compound of which a compositional ratio is from 0.1 part by weight to 5 parts by weight with respect to 100 parts by weight of (A) and which is represented by the following Formula (2):

Formula (2)

wherein $R^1$ represents a hydrogen atom or a substituent, and at least one $R^1$ is a methyl group or a hydroxyl group; and m represents an integer of from 3 to 6.

2. A resin composition, comprising:
a resin compound including a reaction product of (A) aliphatic polyester and/or aliphatic polyamide and (B) an aromatic compound of which a compositional ratio is from 0.1 part by weight to 5 parts by weight with respect to 100 parts by weight of (A) and which is represented by the following Formula (2):

Formula (2)

wherein $R^1$ represents a hydrogen atom or a substituent, and at least one $R^1$ is a methyl group or a hydroxyl group; and m represents an integer of from 3 to 6; and
a condensed phosphoric acid ester.

3. A resin-molded product, comprising:
a resin compound including a reaction product of (A) aliphatic polyester and/or aliphatic polyamide and (B) an aromatic compound of which a compositional ratio is from 0.1 part by weight to 5 parts by weight with respect to 100 parts by weight of (A) and which is represented by the following Formula (2):

Formula (2)

wherein $R^1$ represents a hydrogen atom or a substituent, and at least one $R^1$ is a methyl group or a hydroxyl group; and m represents an integer of from 3 to 6.

4. The resin-molded product according to claim 3, further comprising a condensed phosphoric acid ester.

5. The resin-molded product according to claim 3, which is molded by injection molding.

* * * * *